(12) United States Patent
Guase et al.

(10) Patent No.: US 9,302,177 B2
(45) Date of Patent: *Apr. 5, 2016

(54) SLOTS-FUELED ADVENTURE

(71) Applicant: Zynga Inc., San Francisco, CA (US)

(72) Inventors: Josh Guase, Austin, TX (US); Nimai Malle, Austin, TX (US); Nathan Ratcliffe, Austin, TX (US)

(73) Assignee: Zynga Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/270,049

(22) Filed: May 5, 2014

(65) Prior Publication Data

US 2014/0235312 A1 Aug. 21, 2014

Related U.S. Application Data

(63) Continuation of application No. 13/685,378, filed on Nov. 26, 2012, now Pat. No. 8,734,234.

(51) Int. Cl.
*A63F 13/00* (2014.01)
*G07F 17/32* (2006.01)

(52) U.S. Cl.
CPC ............ *A63F 13/005* (2013.01); *G07F 17/326* (2013.01); *G07F 17/3286* (2013.01)

(58) Field of Classification Search
USPC ...................................................... 463/31–43
See application file for complete search history.

(56) References Cited

U.S. PATENT DOCUMENTS

| | | | |
|---|---|---|---|
| 6,988,947 B2 * | 1/2006 | Baerlocher et al. ............. | 463/20 |
| 7,361,086 B2 * | 4/2008 | Gazdic et al. ................... | 463/16 |
| 8,328,643 B1 * | 12/2012 | Osvald et al. .................... | 463/42 |
| 2002/0016200 A1 * | 2/2002 | Baerlocher et al. ............. | 463/20 |
| 2008/0004103 A1 * | 1/2008 | Kojima ........................... | 463/20 |
| 2009/0247268 A1 * | 10/2009 | Yoshizawa ...................... | 463/20 |
| 2011/0212766 A1 * | 9/2011 | Bowers et al. .................. | 463/25 |
| 2011/0212785 A1 * | 9/2011 | Gura et al. ...................... | 463/42 |
| 2011/0218035 A1 * | 9/2011 | Thomas .......................... | 463/25 |
| 2011/0244964 A1 * | 10/2011 | Glynne-Jones et al. ......... | 463/40 |
| 2012/0077587 A1 * | 3/2012 | Apirian et al. .................. | 463/31 |
| 2012/0100903 A1 * | 4/2012 | Kwon ............................. | 463/16 |

* cited by examiner

*Primary Examiner* — Masud Ahmed
(74) *Attorney, Agent, or Firm* — Martine Penilla Group, LLP

(57) ABSTRACT

Methods, systems, and computer programs are presented for executing an adventure game. One method includes operations for sending an interface for a betting game, and for starting an online game that is displayed simultaneously with the interface for the betting game. The method further includes operations for detecting a bet placed in the betting game, and for determining an outcome of the bet in the betting game. An avatar is advanced along a path of the online game, where the amount of advancement of the avatar is based on the outcome of the bet.

19 Claims, 11 Drawing Sheets

SLOTS-FUELED ADVENTURE

CLAIM OF PRIORITY

This application is a Continuation Application under 35 USC §120 of U.S. application Ser. No. 13/685,378, entitled "SLOTS-FUELED ADVENTURE", and filed on Nov. 26, 2012, and is herein incorporated by reference.

CROSS REFERENCE TO RELATED APPLICATIONS

This application is related by subject matter to U.S. patent application Ser. No. 13/685,403 filed on Nov. 26, 2012, and entitled "SOCIAL COLLABORATION IN CASINO GAME", and to U.S. patent application Ser. No. 13/483,971, filed May 30, 2012, and entitled "VIRAL PROGRESSIVE JACKPOT," all of which are incorporated herein by reference.

BACKGROUND

1. Field of the Invention

The present embodiments relate to methods for executing a game, and more particularly, methods, systems, and computer programs for executing casino games.

2. Description of the Related Art

The popularity of casino games has extended to casino games played online. Online games such as poker, slots, blackjack, etc., are played by a large number of users on a computer. However, most of the slot games in the market are very similar to the real-life slot games that have been around for a long time, and the online slot games merely seem to copy the user interface provided by the real slot machines, without adding much to the online experience. Because of this, differentiation between game providers is very small.

Additionally, social interaction in online games is appealing to many users that wish to share some of their gaming experience with other friends, or other potential friends that may be made online. But existing slots online games do not currently provide many opportunities for social interaction with other players, nor they provide gaming interactions with other players, as the game of one slots player does not relate to the game of another slots players.

It is in this context that embodiments arise.

SUMMARY

Methods, devices, systems, and computer programs are presented for executing a game. It should be appreciated that the present embodiments can be implemented in numerous ways, such as a method, an apparatus, a system, a device, or a computer program on a computer readable medium. Several embodiments are described below.

In one embodiment, a processor-implemented method for executing a game is provided. The method includes operations for detecting a bet placed on a slots game, and for calculating a win amount based on the bet and based on mechanics for calculating prizes on the slots game. Additionally, an avatar is advanced along a path of an adventure game associated with the slots game, where the advancement is based on the win amount.

In another embodiment, a server for executing a game includes a processor, and a non-transitory memory in communication with the processor. The non-transitory memory includes program instructions for a game manager module, and program instructions for a spin manager module. The game manager is operable to detect a bet placed on a slots game by a first player in a remote client device in communication with the server, and the spin manager is operable to calculate a win amount based on the bet and based on mechanics for calculating prizes on the slots game. In addition, the game manager is operable to advance an avatar along a path of an adventure game associated with the slots game, the advancement of the avatar being based on the win amount, and the game manager is operable to transmit to the remote client results of the win amount and the amount of advancement of the avatar.

In yet another embodiment, a computer program embedded in a non-transitory computer-readable storage medium, when executed by one or more processors, for executing a game, includes program instructions for detecting a bet placed on a slots game, and program instructions for calculating a win amount based on the bet and based on mechanics for calculating prizes on the slots game. The computer program further includes program instructions for advancing a first avatar along a path of an adventure game associated with the slots game, where the advancement is based on the win amount. The first avatar is selectable by a player from a plurality of avatars.

Other aspects will become apparent from the following detailed description, taken in conjunction with the accompanying drawings.

BRIEF DESCRIPTION OF THE DRAWINGS

The embodiments may best be understood by reference to the following description taken in conjunction with the accompanying drawings.

DETAILED DESCRIPTION

The following embodiments describe a method and apparatus for executing a game. It will be apparent, that the present embodiments may be practiced without some or all of these specific details. In other instances, well known process operations have not been described in detail in order not to unnecessarily obscure the present embodiments.

Figure 1A:
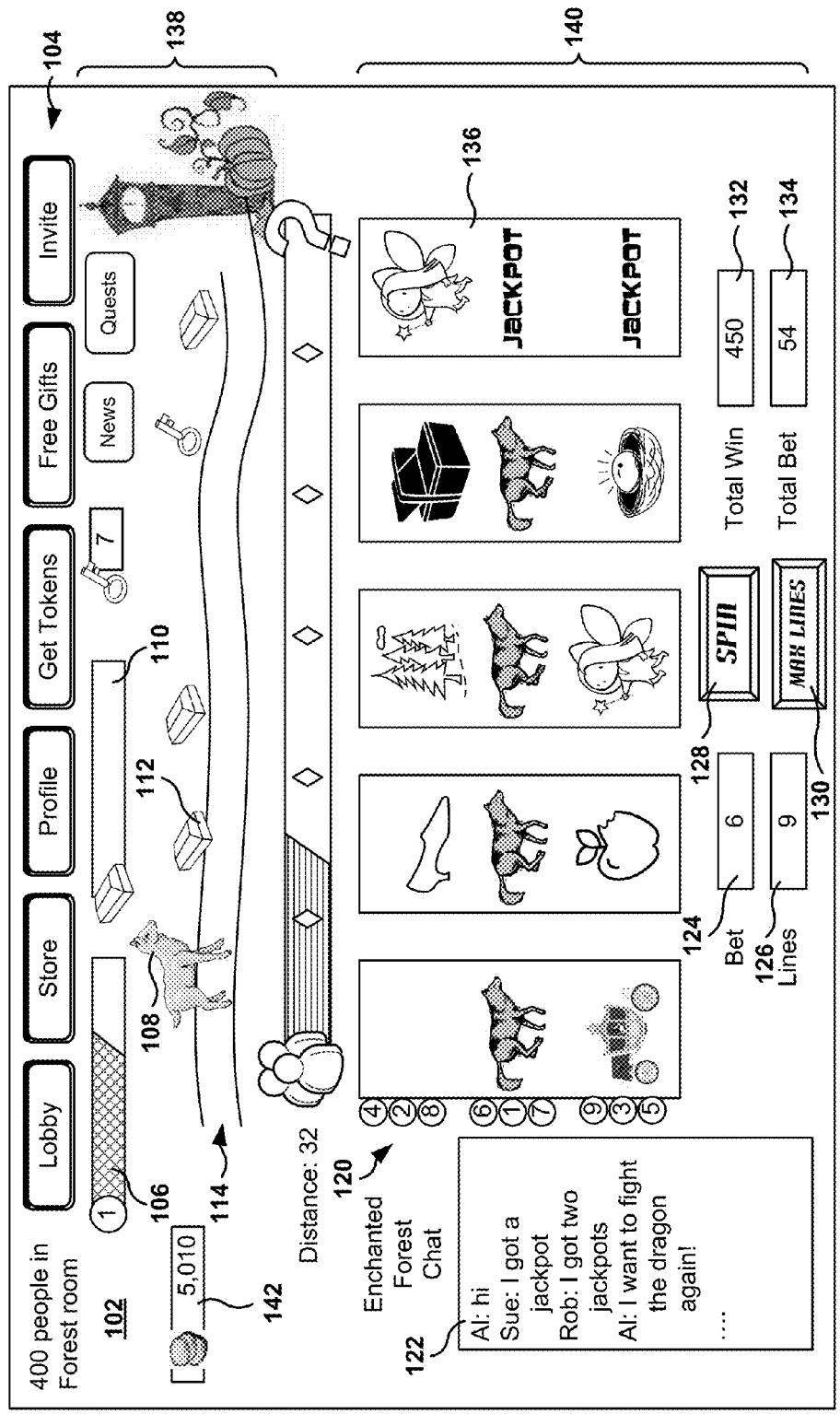
FIG. 1A is a Graphical User Interface (GUI) for playing a slots game, according to one embodiment.

FIG. 1A is a Graphical User Interface (GUI) for playing a slots game, according to one embodiment. As used herein, a "friend" of a player refers to a person that has established a social link with the player in the game. For example, a first player has invited a second player to be "buddies" or "friends" in the game, and the second player has accepted, which makes them "friends" in the game. In other embodiments, the friendship in the game is established via a social network, such that friends of the player in the social network become friends of the player in the online game. It is noted that although two persons may be friends in real life, if the two persons have not established a friendship relationship online, they will not be considered friends in the online game. Of course, if two persons do not know each other in real life, and they do not have an online friendship relationship, the two persons will not be friends in the game.

It is also noted that the embodiments described herein are described with reference to the slots online game, but the principles may be utilized in other gambling online games, as well as in gambling real-life games. The embodiments described herein should therefore not be interpreted to be exclusive or limiting, but rather exemplary or illustrative.

The game interface display 102 includes a slots-playing area 140, an adventure area 138, and overhead selection buttons 104. The GUI includes a lobby, where the player may select one of several rooms for playing slots games. The rooms have different themes, such as underwater world, desert, city, tropical paradise, battle zone, animal reserve, etc. There could be several instances of a theme, so there may be several rooms with the same theme. Once the player selects a room, the player is presented GUI 102 to play slots, such as the one shown in FIG. 1A.

There are players people going in and out of the slots rooms. There is a lobby, and the player may select from different rooms. For example, there is an underwater room, a desert room, a jungle room, etc. There could be several instances of a room with, for example, 100 people or more.

The slots-playing area 140 includes slot wheels 136, a chat area 122, and buttons and counters related to the betting in the slots game. The wheels 136 spin when the player presses (e.g., clicks on) the spin button 128. The player is able to enter the amount of lines 126 to bet on each wheel spin. Each line includes a different combination of locations within each wheel. For example, one line may include the five locations across the center line, while other lines may form different combinations of locations, such as the top location on the first three wheels, followed by the center location on the fourth wheel, and followed by the bottom location on the fifth wheel.

In bet field 124 the player enters the amount being bet for each line, and the total bet field 134 indicates the total amount bet in the current spin. Counter 142 indicates the amount of currency owned by the player for placing bets in the slots game. The total bet amount is equal to the number of lines 126 times the bet per line 124. A maximum lines button 130 provides a shortcut to the player for betting the maximum number of lines. When the player gets a winning combination of the wheels, the total win field 132 indicates the amount won. The chat area 122 allows players in the same room to exchange messages with each other or with the whole community in the room.

In the adventure area 138, an adventure game takes place, where a pet 108 (also referred to as an avatar or a mount) advances along a road 114 to get points, overcome obstacles, play mini-games, etc. The adventure game is inter-linked with the slots game. To move the pet 108, the player spins the slots machine 140 situated below the adventure game 138, to win prizes, causing the pet to advance. In one embodiment, the amount of progress made by the pet 108 is proportional to the amount of winnings, where if there are no winnings in a spin of the wheel, then there is no advancement, and if there is a win after spinning the wheel, the advancements is proportional to the amount won. In another embodiment, pet 108 always makes some progress after spinning the wheel, and the progress is proportional to the amount won, where a little progress is made if there is no win in the slots, and if there is a win in the slots, then the progress is proportional to the win and is bigger than the progress made when no amount is won.

In one embodiment, even when the player loses, the player obtains meta-cash, which can be used to buy virtual items, but not to play the slots machine. In one embodiment, the meta-cash 112 randomly appears on the road, and as the pet collects the gems, the meta-cash is added to the meta-cash counter 110. In addition, the pet 109 may find other rewards as the pet advances along the road, such as special keys, special gems, energy, etc.

Adventure progress bar 106 is a graphical indicator of the progress made along the road. In one embodiment, the road is considered infinite because the road does not have a defined end. As the pet moves along the road, adventure progress bar 106 fills up, and when the adventure progress bar 106 is completely filled up, some rewards are given to the player, and the adventure progress bar is reset, for example to start a new level.

It is noted that the embodiments illustrated in FIG. 1A are exemplary. Other embodiments may utilize different layouts, adventure games, game themes, betting mechanisms, etc. The embodiments illustrated in FIG. 1A should therefore not be interpreted to be exclusive or limiting, but rather exemplary or illustrative.

Figure 1B:
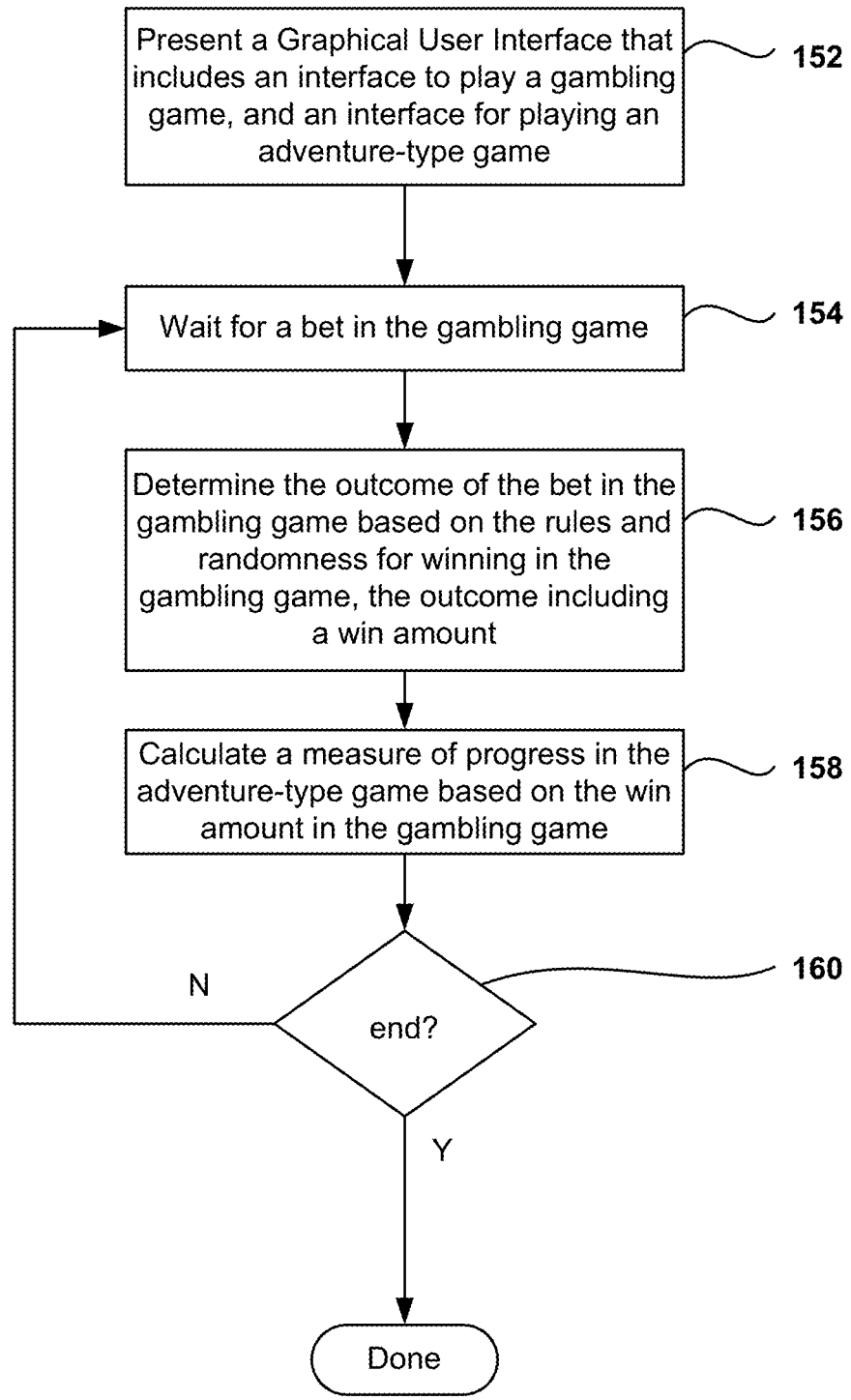
FIG. 1B is a flowchart for playing a gambling game and an adventure game that are inter-linked, according to one embodiment.

FIG. 1B is a flowchart for playing a gambling game and an adventure game that are inter-linked, according to one embodiment. In operation 152, a Graphical User Interface (GUI) is presented to the player, where the GUI includes an interface for playing a gambling game and an interface for playing an adventure-type game. In one embodiment, the gambling game and the adventure-type game are interlinked, which means that the some operations in one game affect the progress of the player in the other game. In another embodiment, some operations in a first game affect the progress in a second game, and some operations in the second game affect the progress in the first game.

In one embodiment, the gambling game is selected from a group consisting of a slots game, a poker game, a blackjack game, a bet on a sports event, other casino games, etc. For description purposes, embodiments presented here utilize a slots game, but the principles may be utilized for any other type of gambling game.

In one embodiment, the adventure-type game includes an avatar that travels along the road, and the progress of the avatar along the road, as well as some of the rewards obtained by the avatar, depend on the outcomes in the gambling game. In other embodiments, the outcome in the gambling game may result in a plurality of operations in the adventure game, such as advancing on the road, traveling in different directions in a game map, unlocking new game areas, obtaining rewards, obtaining new assets, obtaining additional game currency for the adventure game, etc.

It is noted that the embodiments illustrated in FIGS. 1A and 1B are exemplary. Other embodiments may utilize different games, different inter-relations between the games, etc. The embodiments illustrated in FIGS. 1A and 1B should therefore not be interpreted to be exclusive or limiting, but rather exemplary or illustrative.

From operation 152, the method flows to operation 154 where the game waits for a bet to be placed by the player in the gambling game. Once the bet is received, the method continues to operation 156, where the game determines the outcome of the bet in the gambling game (e.g., whether there is a winning combination after spinning the slots wheels). The outcome of the bet includes a win amount, which may be zero or greater than zero. In one embodiment, the outcome of the bet is based on rules created by the game designers, as described in more detail below with reference to FIGS. 5 and 6.

In operation 158, the measure of progress in the adventure-type game is calculated, where the measure of progress is based on the win amount in the gambling game. From operation 158, the method flows to operation 160 where a check is made to determine if an end of the presentation of the GUI has taken place. If the player has selected to end the GUI the method terminates, and if and end has not been requested the method flows back to operation 154 to wait for the next bet in the gambling game.

Figure 2:
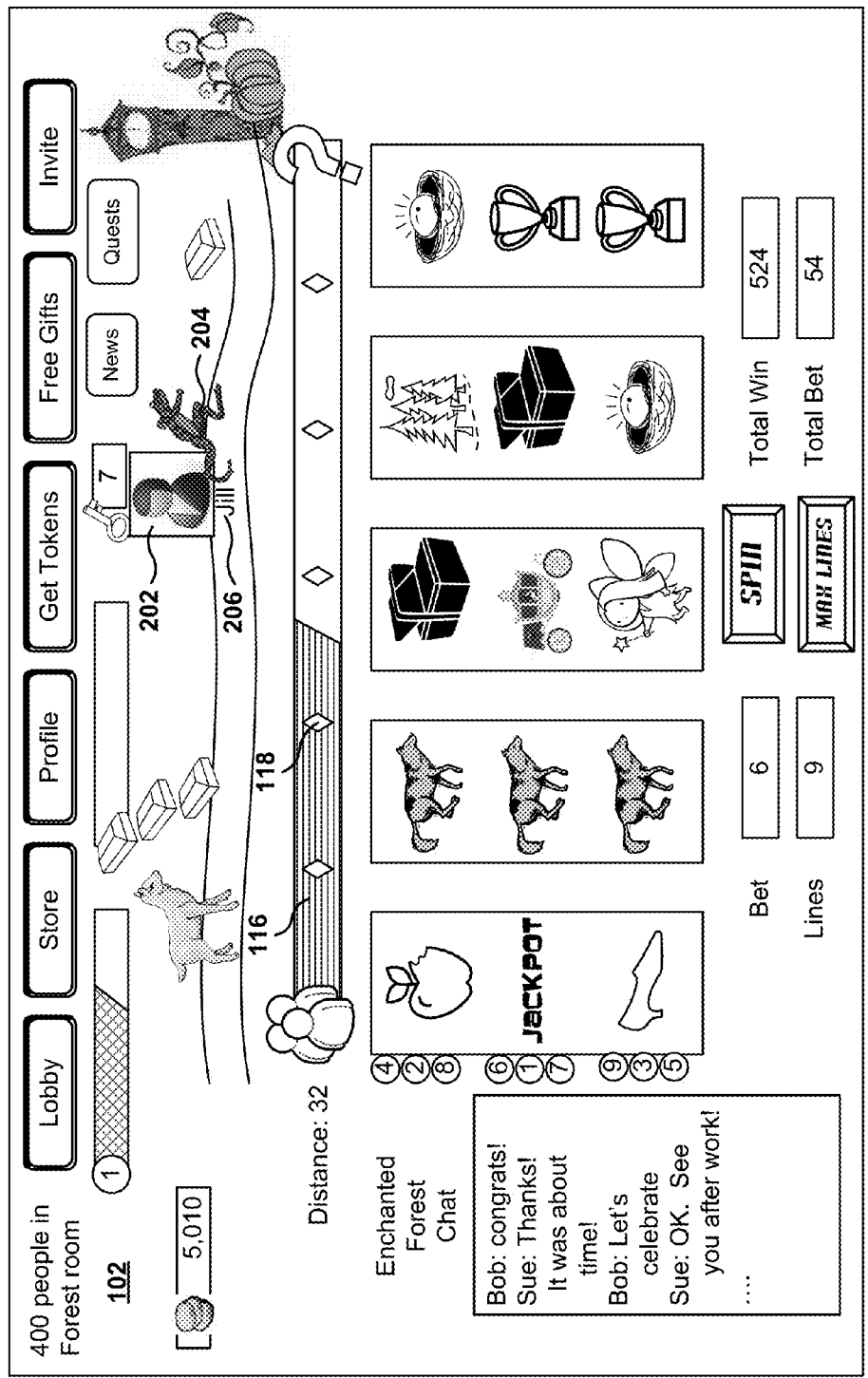
FIG. 2 illustrates the presence of a friend in the board game of a player, according to one embodiment.

FIG. 2 illustrates the presence of a friend in the board game of a player, according to one embodiment. The combination slots-and-adventure game is a social game, and other players may also be seen on the road as the pet moves. In one embodiment, the road in the adventure game is a road shared by the players in the same slots room. Since the road is shared, this means that sometimes players are in the same place, or nearby, along the road. In one embodiment, the players that are in the same vicinity of the player's pet are displayed on the road.

In another embodiment, only friends of the player that are in the same vicinity of the player's pet are shown on the road. For example, a friend of the player is shown on the road, including the name 206 (e.g., Jill), the friends pet 204 (e.g., frog pet), and icon 202, which may be a picture of the player.

In addition, the players playing slots in the same room (also referred to as playing in the same slots machine) are also playing as a team to make progress in the adventure game. The team collaboration is referred to as a progressive collaboration game. In one embodiment, when a player in the room gets a big win in the slots, the winner appears on the screen of other players in the room and shares some of the winnings. In one embodiment, the sharing is done by dropping gems in the roads of other players so their pets can pick up the gems in the road.

Community progress bar 116 shows the progress made by the players as a team in the current slots machine. As the players make progress in the game, the community progress bar 116 gets filled to indicate how far the players have advanced as a group. Milestones 118 in community progress bar 116 define special locations, that when reached by the group, cause the game to reward the players, provide a game challenge, or some other game operation. In one embodiment, when group reaches milestone 118, a special game operation takes place, such as giving the players more energy or prices, increasing the experience level, providing a mini-game, battling against a common enemy, etc. In the one embodiment, when community progress bar 116 gets completely full, a challenge is presented to the room as a whole, for example by fighting a dragon together. After the challenge is completed, the community progress bar is reset back to the beginning.

The community approach to fill the community progress bar provides a collaborative experience to the players in the room, because the players fill the community progress bar by working together.

Figure 3:
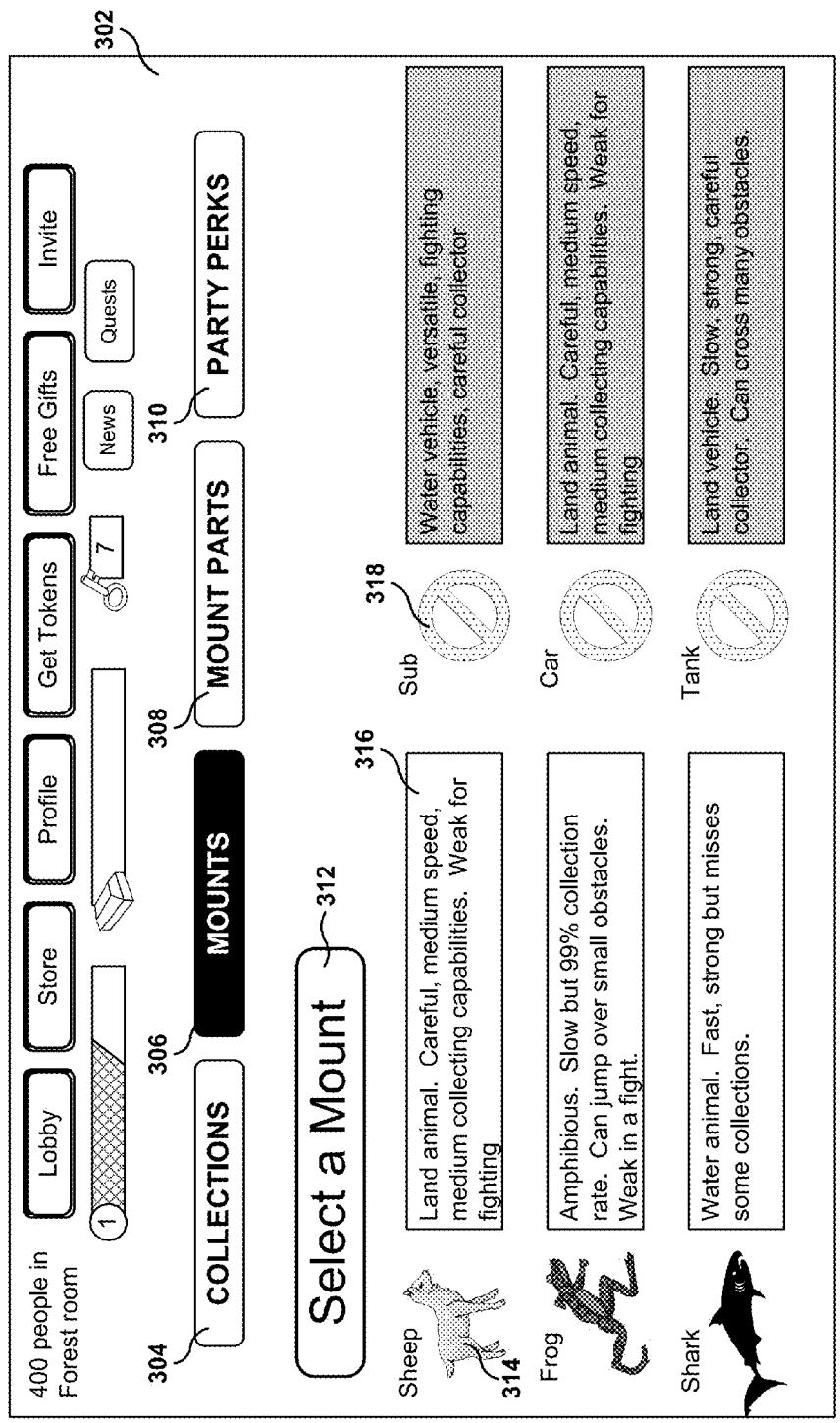
FIG. 3 shows an interface for selecting the pet for the adventure game associated with the slots game, in accordance with one embodiment.

FIG. 3 shows an interface for selecting the pet for the adventure game associated with the slots game, in accordance with one embodiment. The player may select from different pets to play in the game, where each pet may have different characteristics, strengths, weaknesses. For example, pets may travel at different speeds in the adventure road. Some pets my travel at a slow speed (e.g., frog, snail), while other pets may travel faster (e.g., cheetah, shark).

In addition, some pets travel better in land (e.g., horse, four-wheel vehicle) while other pets travel better in water (e.g., gold fish, submarine), and some pets may travel over land and water (e.g., frog), etc. Further yet, pets may have different collection rates, where the collection rates refers to the ability to collect items found on the road (e.g., gems, gold coins, keys, etc.). For example, slow pets may have higher collection rates than faster pets because slower pets travel slower.

Additionally, pets may have different fighting skills, were some pets are stronger and have better fighting capabilities (e.g., shark, eagle, tank) and other pets are weaker (e.g., lamb, frog). Further yet, some pets may be able to jump over obstacles (e.g., all-terrain vehicle) while other pets may take longer to overcome obstacles (e.g., elephant).

It is noted that the embodiments illustrated in FIG. 3 are exemplary. Other embodiments may utilize different types of pets, skills, adventure games, gambling games, etc. The embodiments illustrated in FIG. 3 should therefore not be interpreted to be exclusive or limiting, but rather exemplary or illustrative.

In one embodiment, the game GUI includes several options for managing player assets, such as collections 304, mounts 306, mount parts 308, and party perks 310. Pets are also referred to herein as mounts. The exemplary embodiment of FIG. 3 shows a graphical interface for selecting the mount 312.

In one embodiment, the player is able to select which mount to use for the road adventure. As the player advances in the game, the player gains expertise and new mounts are made available to the player. In the exemplary embodiment of FIG. 3, three mounts are available to the player (sheep, frog, and shark), while three other mounts (submarine, car, and tank) are not yet available but are presented to the user to encourage the user to get the necessary assets to unlock these pets.

In one embodiment, the pets that are available include an icon 314, such as a picture of a sheep for the sheep pet, and the pets that are not available are represented by a special symbol 318 to indicate that the pets are not available, also referred to as being locked.

For each pet or mount, a brief description 316 is provided to indicate the skills and characteristics of the mount. In one embodiment, if the player clicks on the mount, a different page is presented to provide further details about the characteristics of the mount. If the mount is not yet available, a description of the price for getting the mount is provided.

Figure 4:
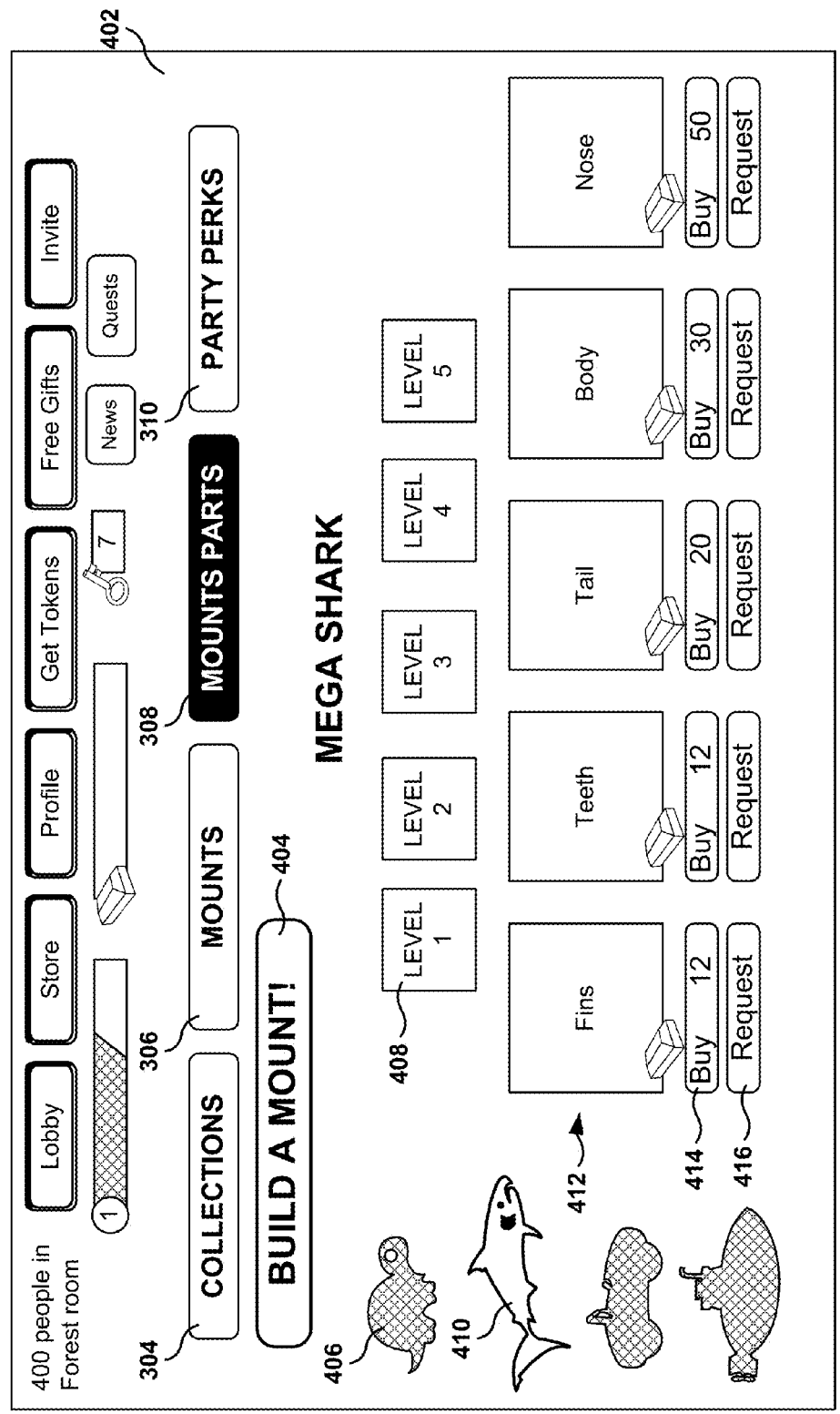
FIG. 4 presents a user interface for managing collectibles, according to one embodiment.

FIG. 4 presents a user interface for managing collectibles, according to one embodiment. In one embodiment, some mounts can be achieved by collecting a plurality of parts. Once all the parts for a mount are collected, then the player may exchange all the parts for the corresponding completed mount.

In the exemplary embodiment of FIG. 4, a page 402 for building mounts is presented. When the player selects the option "mount parts" 308, several different mounts are presented to the player, such as mounts 406 and 410. Some of the mounts may not be available to the player yet, such as mount 406, because the player has not yet reached a certain level or milestone in the game. The unavailable mounts are presented as grayed out, dimmed, or with some other recognizable characteristic to indicate that the mount is not yet available. Other mounts, such as shark 410, include an icon that is not grayed out to show that the mount is available for completion by the player.

Completion includes collecting all the parts 412 associated with the mount. In one embodiment, the parts 412 to build a shark pet include fins, teeth, tail, body, and nose, but other embodiments may utilize different parts. In one embodiment, each part may be bought by the player 414 utilizing game currency, such as meta-cash, although other types of currency or assets are also possible. In addition, the player may request 416 other players to help, and when other players help, the requester gets the required part. In one embodiment, a request includes sending a petition in the social network or in another website, such as the website of the game provider. In another embodiment (not shown), a submarine is built by the player as a mount. To build the submarine, the player needs to collect 15 pieces of metal, five pieces of glass, 20 bolts, and 3 units of power. The mounts that are made by putting together parts are also referred to as buildables or collectibles.

Once the player collect all the parts, clicking in the option "Build a Mount!" 404 creates or builds the mount. In one embodiment, the mount may have different levels of performance 408. The first time the mount is built, the mount is a basic mount with basic features. In higher levels, the mount improves its appearance or performance in the adventure game. In order to get higher levels of the mount, additional parts must be gathered. Therefore, if the player has already obtained the mount for level 2, the parts area 412 will list the parts necessary to get to level 3 for the same mount.

By providing multiple levels for the mount, the player is given challenges to improve the mount. The top level mount will be better looking, and have better abilities to advance in the game, than lower level mounts. As players obtain more sophisticated mounts, other players that see the sophisticated mounts in the game will be encouraged to also get sophisticated mounts.

Figure 5:
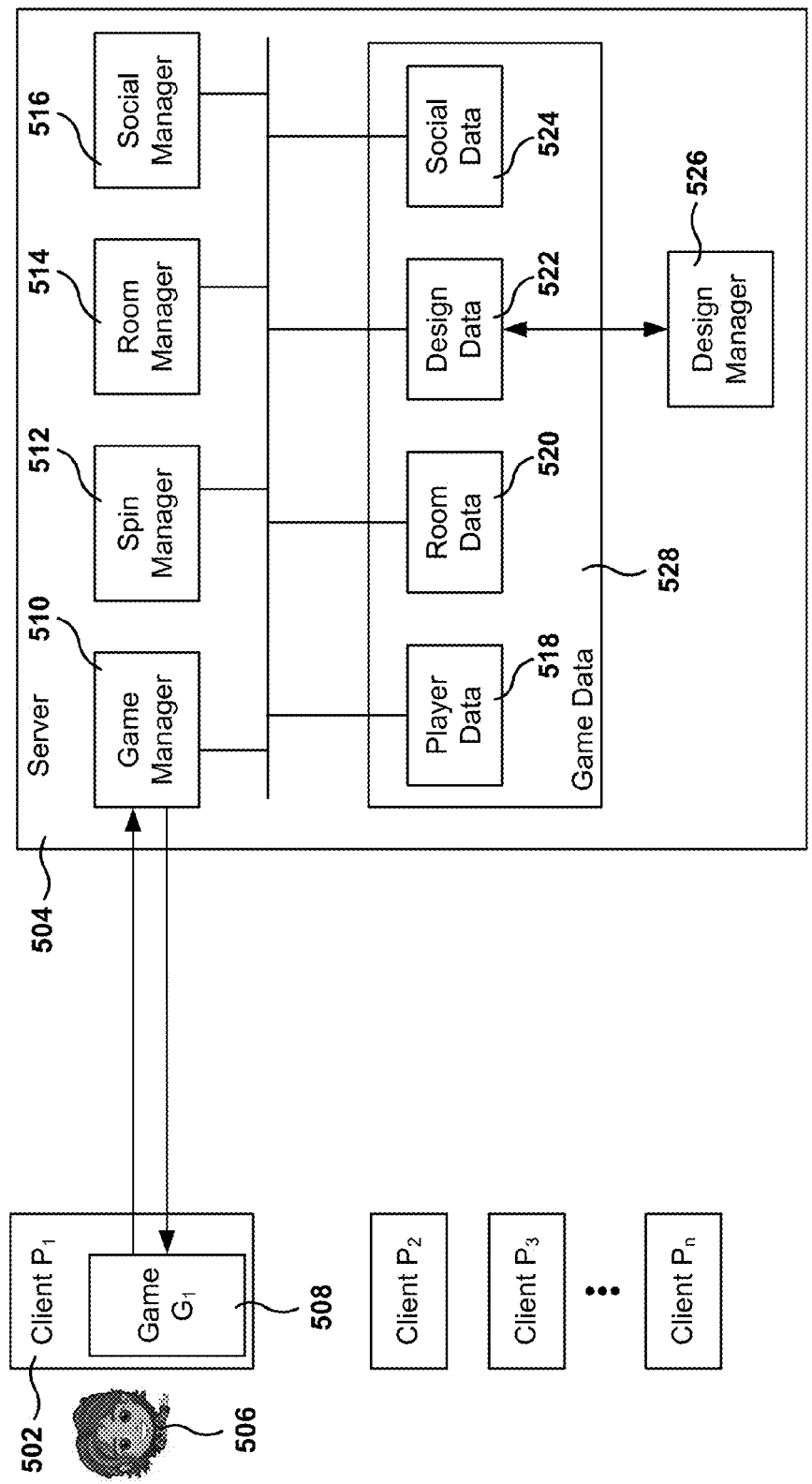
FIG. 5 illustrates the structure of the server for the slots game, according to one embodiment.

FIG. 5 illustrates the structure of the server for the slots game, according to one embodiment. In one embodiment, the online game is hosted by server 504, which includes game manager 510, spin manager 512, room manager 514, social manager 516, design manager 526, and game data 528. A player $P_1$ 506 plays the game utilizing client device 502 executing a computer program. In one embodiment, the client device 502 utilizes a web browser 158, and in another embodiment other computer programs may also be utilized to play the game, such as a computer program loaded on a computing device for the exclusive purpose of playing the game.

In one embodiment, game manager 510 manages the game operations for each of the players, and game manager 510 interacts with other modules to perform respective game operations within the game. In addition, the game manager 510 manages the game data stored for running the player's games, although other modules may also access and change some of the game data. In one embodiment, the functionality implemented by game manager 510 includes presenting the game board to the player (e.g., including the gambling game and the adventure game), presenting options to the player for customizing and controlling an avatar of the game, providing an interface between the player and other game modules, synchronizing game operations with client 502, managing communications with client 502, etc.

Spin manager 512 manages the gambling operations in the game. In one embodiment, spin manager controls the amount that may be wagered by the player in the gambling game (e.g., number of lines, amount bet per line, etc.). In one embodiment, spin manager 512 receives a betting instruction from client 508 and performs a game simulation regarding the chance game being played. For example, the spin manager "spins" the wheels and determines the outcome of the spinning, including a possible win amount. The calculation of prizes is also referred to as game mechanics for calculating prizes in the slots game. The calculation is based on game rules and a degree of randomness related to the game of chance.

The probability of winning is driven by data set up by game designers. The design data specifies the symbols on the wheels, the combinations that result in payouts, the odds, etc. More details on the design data are given below with reference to FIG. 6.

After calculating the result of the spin, spin manager 512 sends the result back to the client game 508. In another embodiment, the spinning of the wheels is performed in the client device 508, and the client device 508 synchronizes with spin manager 512 to share the results of the betting operations in the gambling game.

Room manager 514 manages the gambling room, the place where a plurality of players play the gambling game, while also cooperating on same game objectives. In a way, each player has its own personal game with its own personal objectives, but all the players also share one common game that is interrelated with the individual games.

In one embodiment, the common game relates to a community progress bar, and involves some periods of cooperation, such as when all the players in the room work together to beat a Dragon that appears in the adventure game. In one embodiment, there is collaboration in the game, and as every player spins and gets points the bar gets filled for the whole room. All player devices (such has player device 508) in the same room provide updates to the server so the server may calculate the progress of the room in the progress bar. Therefore, the clients send updates to the server 504, and the server 504 periodically sends out the current state of the community progress bar (e.g., every five seconds, although other periods are also possible). In one embodiment, the frequency of updates is completed by the game designers and is kept in the design data 522.

In addition, room manager 514 periodically checks the position of each of the players in the room within the road of the adventure game. In one embodiment, when two friends are in the same area in the road, room manager 514 sends updates to each player so the GUI of each player displays the name, or some other symbol, associated with the friend. In one embodiment, to increase the awareness of other players being in the room, room manager 514 will also send instructions to display the pets from some players that are not friends, in order to see more traffic in the game road. If the game road has a large number of players, not all players are displayed on the road, because it would lead to congestion in the screen.

Social manager 516 manages the social interactions of the players, which include determining the social links established within the game and outside the game among the players. For example, the social manager 516 may suggest friends in the social network to the player that may become friends within the game.

Game data 528 represents one or more databases that hold game related data. In one embodiment, game data 528 includes player data 518, room data 520, design data 522, and social data 524. Social data 524 includes the relationships established by players in the game within the game, and the relationships existing among the players in one or more social websites. More details on design data, player data, and room data are given below with reference to FIG. 6.

Design manager 526 provides an interface to the game designers in order to configure the different parameters for operating the game. In addition, the design manager 526 manages the design data 522, which is utilized by the different game modules to determine the outcome of certain game operations in the game, such as winning a bet, collecting gems on the road, or determining which mounts are available at which levels.

It is noted that the embodiments illustrated in FIG. 5 are exemplary. Other embodiments may utilize different game modules, different data modules, or combine the functionality of one or more modules into a single module. The embodiments illustrated in FIG. 5 should therefore not be interpreted to be exclusive or limiting, but rather exemplary or illustrative.

Figure 6:
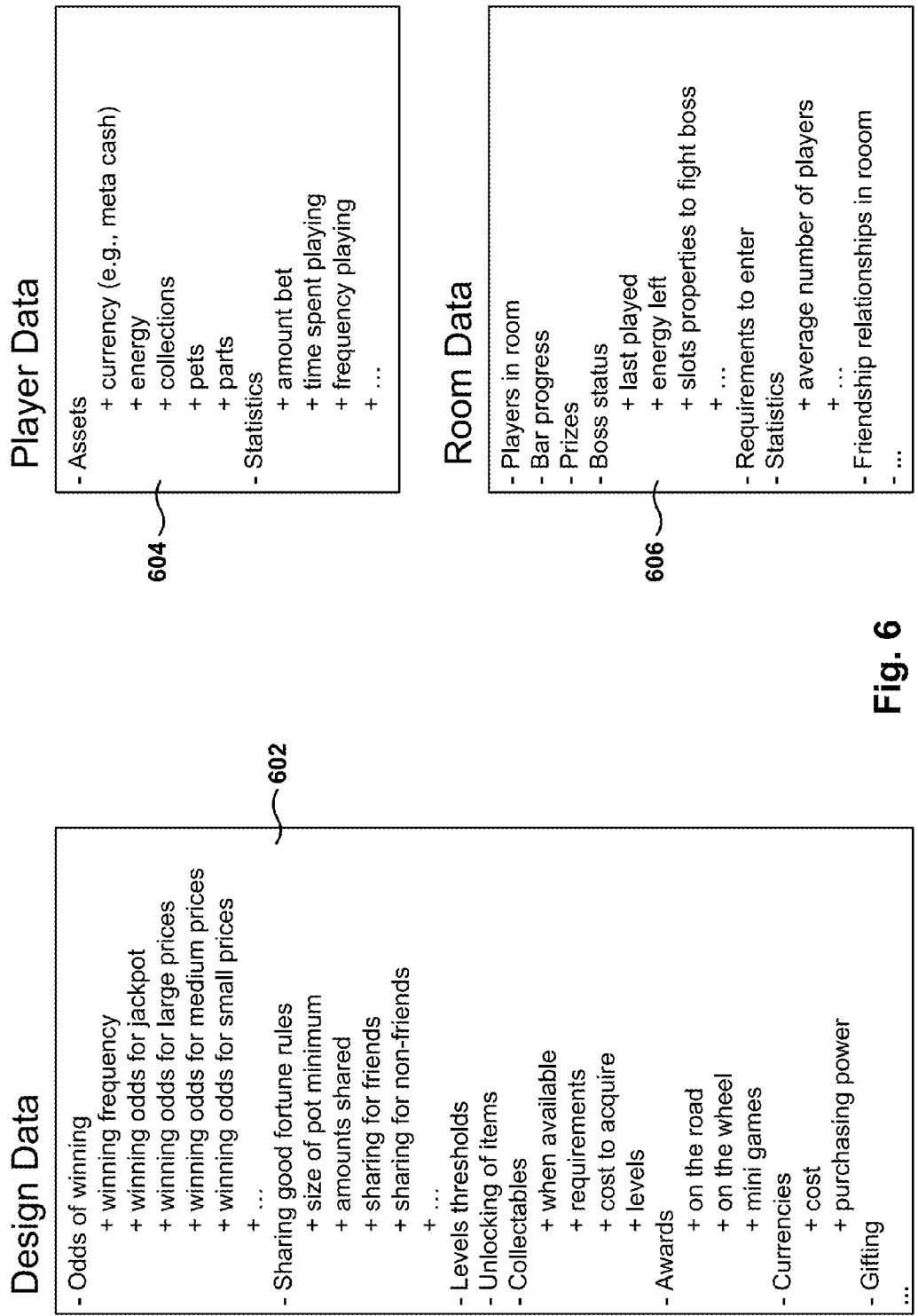
FIG. 6 presents exemplary data structures for holding game related data, according to one embodiment.

FIG. 6 presents exemplary data structures for holding game related data, according to one embodiment. In one embodiment, design data 602 includes several data structures, including the winning-odds parameters, the rules for sharing good fortune (i.e., when a player wins a big jackpot), the achievements required to advance level, rules to unlock items in the game (e.g., cost of buying apart for a mount), collectables, awards, currencies, gifting rules, etc.

Some of the data structures include sub-fields. For example, to calculate the odds of winning in the gambling game, the game designer may set parameters regarding an average winning frequency, the odds for winning a jackpot, the odds for winning a large price, the odds for winning a medium price, the odds for winning a small price, etc. The odds of winning, also include rules (not shown) for determining what constitutes a large, a medium, or a small price.

In one embodiment, when someone in the room gets a big jackpot, some of the other players share the good fortune. The server detects when a player gets a big jackpot and proceeds to place the shared rewards (e.g. gems) on the road, or give the rewards to players in some other fashion. In one embodiment, the rewards given to players are different for friends and for non-friends. In one embodiment, friends get more rewards than non-friends.

The rules for sharing include several rules and parameters associated with the rules, such as the size of the minimum jackpot won by a player in order to share the good fortune with other players, what are the amounts that are shared with other players, when to share with friends or with non-friends in the game, etc.

The data regarding collectibles, in one embodiment, includes specifying when the collectables are available to the player (e.g., expertise required to unlock the collectable), the requirements for getting each of the parts, the cost for each of the parts, the levels at which the parts may be available or usable, etc.

The awards field includes data regarding the placement of awards on the road in the adventure game, the awards and symbols on the wheels, the appearance and behavior of mini games, etc.

In one embodiment, player data 604 includes data about assets owned by the player and about game statistics or behavior. In one embodiment, the asset data includes the amount of currency owned by the player, the amount of energy, the collections completed or in progress, the pets or mounts available to the player, parts acquired and present in inventory, etc. Additionally, the statistical data may include the amounts bet during game play, the amount of time spent playing, the frequency of gameplay, etc.

Room data 606 includes data regarding the players in the room, the progress of the community bar, prices to be given to the room players when milestones are met (or after some other game event), the status of a "boss" that the players in the room are fighting against, the requirements to enter the room, the statistics regarding room play, friendship relationships in the room, etc.

It is noted that the embodiments illustrated in FIG. 6 are exemplary. Other embodiments may utilize different data structures, or organize the data in different fashion, have more or less fields, combine data structures, etc. The embodiments illustrated in FIG. 6 should therefore not be interpreted to be exclusive or limiting, but rather exemplary or illustrative.

Figure 7:
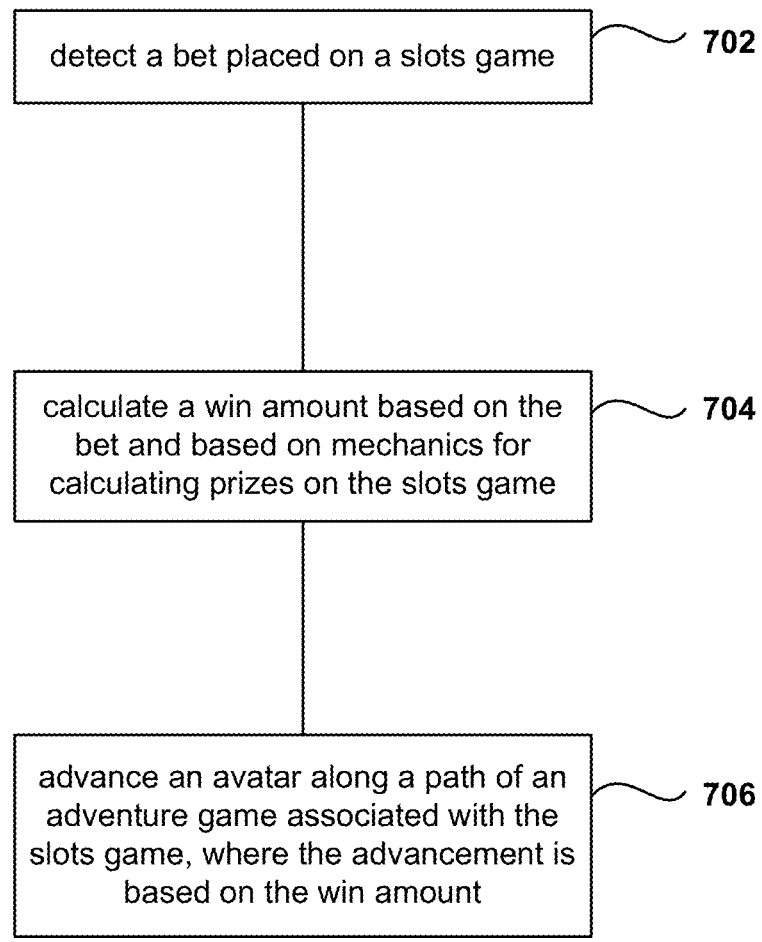
FIG. 7 shows a flowchart illustrating an algorithm for executing a computer game, in accordance with one embodiment.

FIG. 7 shows a flowchart illustrating an algorithm for executing a computer game, in accordance with one embodiment. In operation 702, the game detects that a bet has been placed by the player in the slots game. From operation 702, the method flows to operation 704 where a win amount is calculated based on the bed placed in operation 702, and based on the mechanics defined in the game for calculated the prices for winning the slots.

From operation 704, the method flows to operation 706 where an avatar is advanced along a path within an adventure game. The adventure game is associated or interlinked with the slots game, and the advancement in the adventure game is based on the amount won, if any, in the slots game. In one embodiment, the avatar obtains a predetermined amount of progress in the adventure game, even if the player does not win anything after spinning the wheels of the slots game.

In another embodiment, a player gets meta-cash in the adventure game as a pet advances in the adventure game. The meta-cash may be utilized to acquire game assets, such as parts for building collectibles, which are mounts that are built by putting together a plurality of parts.

Figure 8:
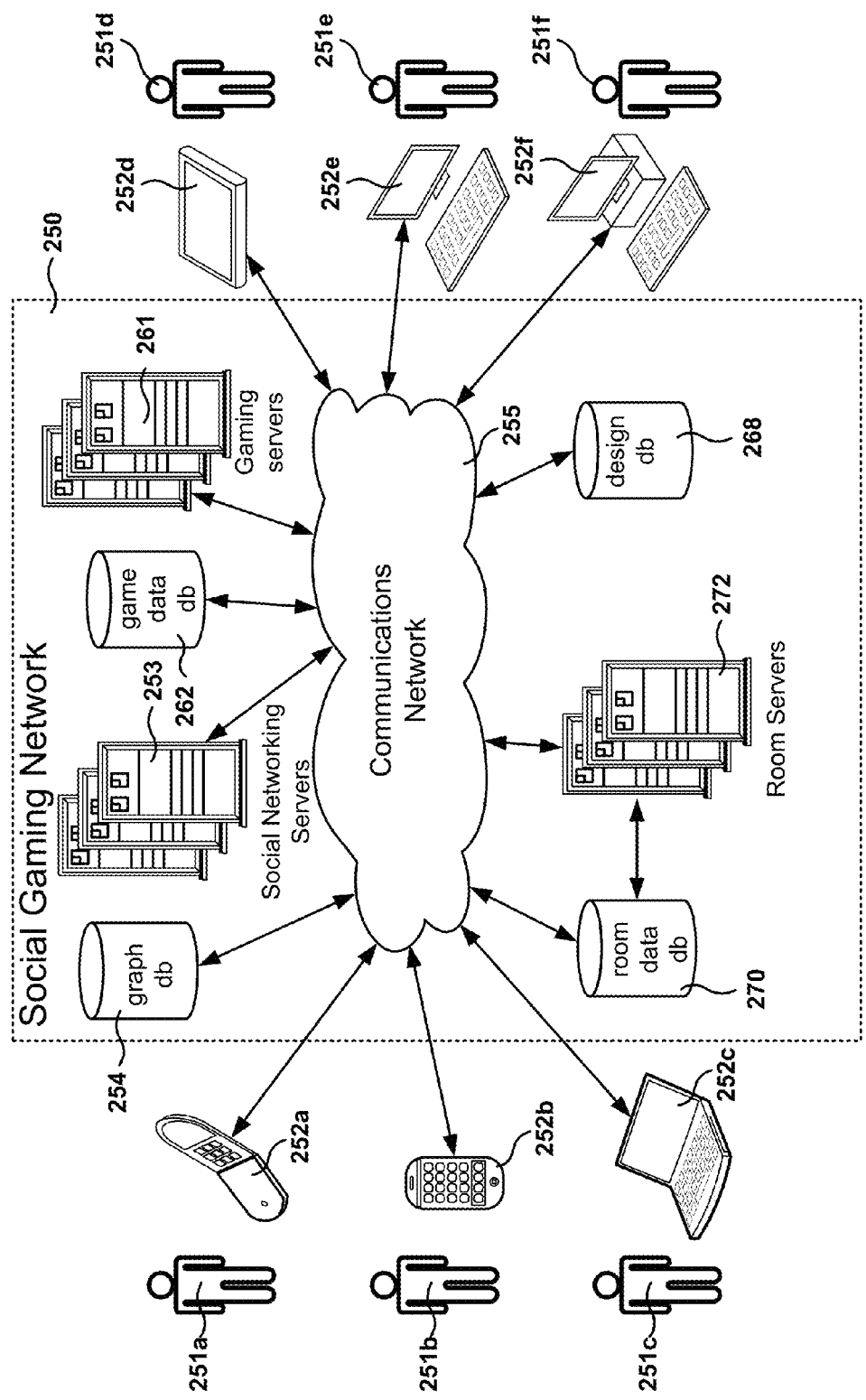
FIG. 8 shows a block diagram illustrating a social-gaming network architecture, according to one embodiment.

FIG. 8 shows a block diagram illustrating a social-gaming network architecture, according to one embodiment. In some implementations, a plurality of players (e.g., 251*a*-251*f*) may be utilizing a social gaming network 250. Each player interacts with the social gaming network via one or more client devices (e.g., client devices 252*a*-252*f*). The clients may communicate with each other and with other entities affiliated with the gaming platform via communications network 255. Further, the players may be utilizing a social networking service provided by a social networking server (e.g., social networking servers 253) to interact with each other.

When a player provides an input into the player's client device, the client device may in response send a message via the communications network to the social networking server. The social networking server may update the player profile, save the message to a database, send messages to other players, etc. The social gaming network may include a social graph database 254, which stores player relationships, social player profiles, player messages, and player social data.

The gaming servers 261 host one or more gaming applications, and perform the computations necessary to provide the gaming features to the players and clients. One or more gaming databases 262 store data related to the gaming services, such as the gaming applications and modules, virtual gaming environment data, player gaming session data, player scores, player virtual gaming profiles, game stage levels, etc. The gaming servers may utilize the data from the gaming databases to perform the computations related to providing gaming services for the players.

Room Servers 272 manage the slot rooms system in the game, including the creation, tracking, expiration, abandonment, and deletion of rooms. In addition, a room database 270 holds room information, and design db 268 holds information data, such as the data associated with the data structures of FIG. 6.

Figure 9:
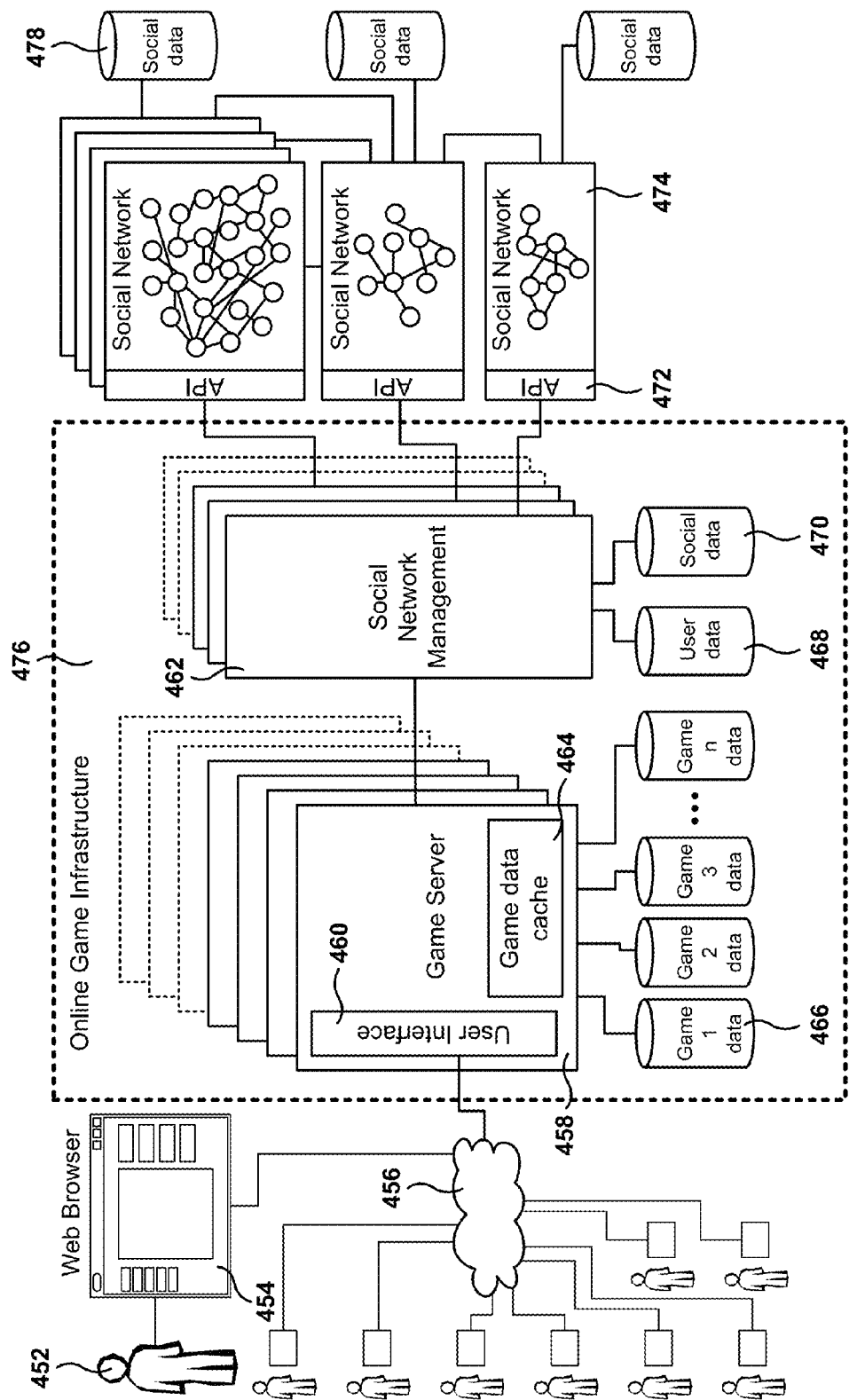
FIG. 9 illustrates an implementation of a Massively Multiplayer Online (MMO) infrastructure, according to one embodiment.

FIG. 9 illustrates an implementation of an online game infrastructure, according to one embodiment. The online game infrastructure 476 includes one or more game servers 458, web servers (not shown), one or more social network management servers 462, and databases to store game related information. In one embodiment, game server 458 provides a user interface 460 for players 452 to play the online game. In one embodiment, game server 458 includes a Web server for players 452 to access the game via web browser 454, but the Web server may also be hosted in a server different from game server 458. Network 456 interconnects players 452 with the one or more game servers 458.

Each game server 458 has access to one or more game databases 466 for keeping game data. In addition, a single database can store game data for one or more online games. Each game server 458 may also include one or more levels of caching. Game data cache 464 is a game data cache for the game data stored in game databases 466. For increased performance, caching may be performed in several levels of caching. For instance, data more frequently used is stored in a high priority cache, while data requiring less access during a session will be cached and updated less frequently.

The number of game servers 458 changes over time, as the gaming platform is an extensible platform that changes the number of game servers according to the load on the gaming infrastructure. As a result, the number of game servers will be higher during peak playing times, and the number of game servers will be lower during off-peak hours. In one embodiment, the increase or decrease of bandwidth is executed automatically, based on current line usage or based on historical data.

One or more social network management servers 462 provide support for the social features incorporated into the online games. The social network management servers 462 access social data 478 from one or more social networks 474 via Application Programming Interfaces (API) 472 made available by the social network providers. An example of a social network is Facebook, but it is possible to have other embodiments implemented in other social networks. Each social network 474 includes social data 478, and this social data 478, or a fraction of the social data, is made available via API 472. As in the case of the game servers, the number of social network management servers 462 that are active at a point in time changes according to the load on the infrastructure. As the demand for social data increases, the number of social network management servers 462 increases. Social network management servers 462 cache user data in database 468, and social data in database 470. The social data may include the social networks where a player is present, the social relationships for the player, the frequency of interaction of the player with the social network and with other players, etc. Additionally, the user data kept in database 468 may include the player's name, demographics, e-mail, games played, frequency of access to the game infrastructure, etc.

It is noted that the embodiment illustrated in FIG. 9 is an exemplary online gaming infrastructure. Other embodiments may utilize different types of servers, databases, APIs, etc., and the functionality of several servers can be provided by a single server, or the functionality can be spread across a plurality of distributed servers. The embodiment illustrated in FIG. 9 should therefore not be interpreted to be exclusive or limiting, but rather exemplary or illustrative.

Figure 10:
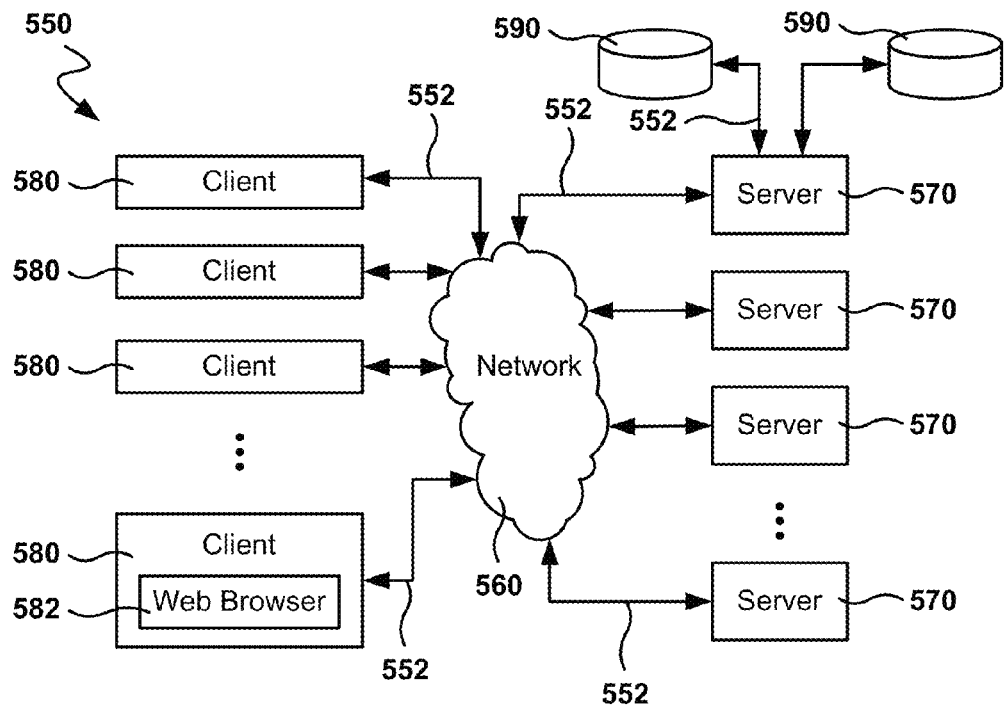
FIG. 10 illustrates an example network environment suitable for implementing embodiments.

FIG. 10 illustrates an example network environment 550 suitable for implementing embodiments. Network environment 550 includes a network 560 coupling one or more servers 570 and one or more clients 580 to each other. In particular embodiments, network 560 is an intranet, an extranet, a virtual private network (VPN), a local area network (LAN), a wireless LAN (WLAN), a wide area network (WAN), a metropolitan area network (MAN), a portion of the Internet, another network, or a combination of two or more such networks 560.

One or more links 552 couple a server 570 or a client 580 to network 560. In particular embodiments, one or more links 552 each includes one or more wired, wireless, or optical links 552. In particular embodiments, one or more links 552 each includes an intranet, an extranet, a VPN, a LAN, a WLAN, a WAN, a MAN, a portion of the Internet, or another link 552 or a combination of two or more such links 552.

Each server 570 may be a stand-alone server or may be a distributed server spanning multiple computers or multiple datacenters. Servers 570 may be of various types, such as, for example and without limitation, jackpot server, gambling server, web server, news server, mail server, message server, advertising server, file server, application server, exchange server, database server, or proxy server. Each server 570 may include hardware, software, embedded logic components, or a combination of two or more such components for carrying out the appropriate functionalities implemented or supported by server 570. For example, a web server is generally capable of hosting websites containing web pages or particular elements of web pages. More specifically, a web server may host HyperText Markup Language (HTML) files or other file types, or may dynamically create or constitute files upon a request, and communicate them to clients 580 in response to Hypertext Transfer Protocol (HTTP) or other requests from clients 580. A mail server is generally capable of providing electronic mail services to various clients 580. A database server is generally capable of providing an interface for managing data stored in one or more data stores.

In particular embodiments, one or more data storages 590 may be communicatively linked to one or more severs 570 via one or more links 552. Data storages 590 may be used to store various types of information. The information stored in data storages 590 may be organized according to specific data structures. In particular embodiments, each data storage 590 may be a relational database. Particular embodiments may provide interfaces that enable servers 570 or clients 580 to manage, e.g., retrieve, modify, add, or delete, the information stored in data storage 590.

In particular embodiments, each client 580 may be an electronic device including hardware, software, or embedded logic components or a combination of two or more such components and capable of carrying out the appropriate functionalities implemented or supported by client 580. For example and without limitation, a client 580 may be a desktop computer system, a notebook computer system, a notebook computer system, a handheld electronic device, or a mobile telephone. A client 580 may enable a network player at client 580 to access network 580. A client 580 may enable its player to communicate with other players at other clients 580. Further, each client 580 may be a computing device, such as a desktop computer or a work station, or a mobile device, such as a notebook computer, a network computer, or a smart telephone.

In particular embodiments, a client 580 may have a web browser 582, such as Microsoft Internet Explorer, Google Chrome, Or Mozilla Firefox, and may have one or more add-ons, plug-ins, or other extensions. A player at client 580 may enter a Uniform Resource Locator (URL) or other address directing the web browser 582 to a server 570, and the web browser 582 may generate a Hyper Text Transfer Protocol (HTTP) request and communicate the HTTP request to server 570. Server 570 may accept the HTTP request and communicate to client 580 one or more Hyper Text Markup Language (HTML) files responsive to the HTTP request. Client 580 may render a web page based on the HTML files from server 570 for presentation to the user. The present disclosure contemplates any suitable web page files. As an example and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in Javascript, Java, Microsoft Silverlight, combinations of markup language and scripts such as AJAX (Asynchronous Javascript and XML), and the like. Herein, reference to a web page encompasses one or more corresponding web page files (which a browser may use to render the web page) and vice versa, where appropriate.

Web browser 582 may be adapted for the type of client 580 where the web browser executes. For example, a web browser residing on a desktop computer may differ (e.g., in functionalities) from a web browser residing on a mobile device. A user of a social networking system may access the website via web browser 582.

Figure 11:
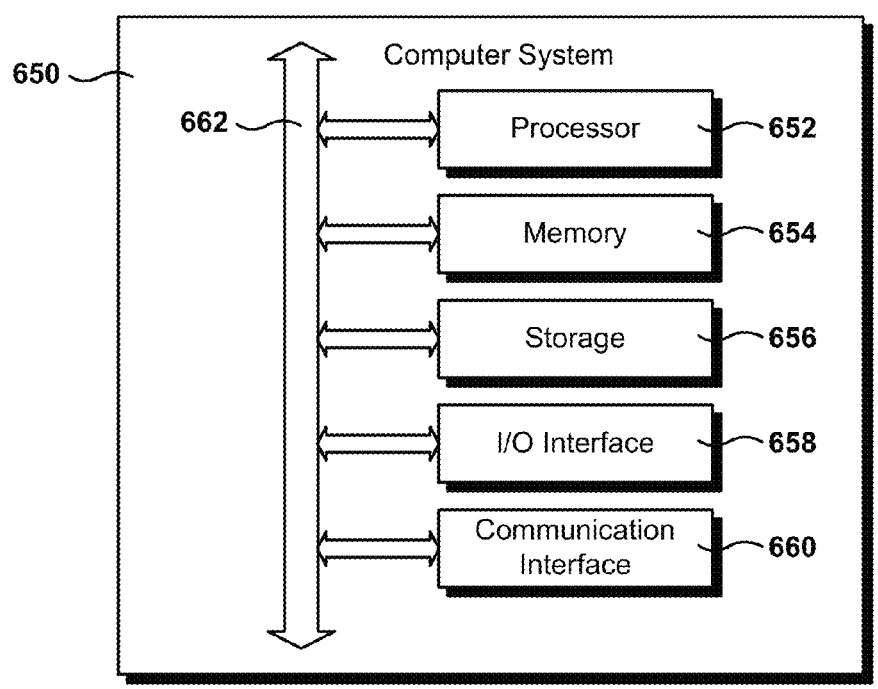
FIG. 11 illustrates an example computer system for implementing embodiments.

FIG. 11 illustrates an example computer system 650 for implementing embodiments. In particular embodiments, software running on one or more computer systems 650 performs one or more operations of one or more methods described or illustrated herein or provides functionality described or illustrated herein. Although methods for implementing embodiments were described with a particular sequence of operations, it is noted that the method operations may be performed in different order, or the timing for the execution of operations may be adjusted, or the operations may be performed in a distributed system by several entities, as long as the processing of the operations are performed in the desired way.

As example and not by way of limitation, computer system 650 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 650 may include one or more computer systems 650; be stand-alone or distributed; span multiple locations; span multiple machines; or reside in a cloud, which may include one or more cloud components in one or more networks. The one or more computer systems 650 may perform in real time or in batch mode one or more operations of one or more methods described or illustrated herein.

In particular embodiments, computer system 650 includes a processor 652, memory 654, storage 656, an input/output (I/O) interface 658, a communication interface 660, and a bus 662. Although this disclosure describes and illustrates a particular computer system having a particular number of particular components in a particular arrangement, embodiments may be implemented with any suitable computer system having any suitable number of any suitable components in any suitable arrangement.

In particular embodiments, processor 652 includes hardware for executing instructions, such as those making up a computer program. As an example and not by way of limitation, to execute instructions, processor 652 may retrieve (or fetch) the instructions from an internal register, an internal cache, memory 654, or storage 656; decode and execute them; and then write one or more results to an internal register, an internal cache, memory 654, or storage 656. The present disclosure contemplates processor 652 including any suitable number of any suitable internal registers, where appropriate. Where appropriate, processor 652 may include one or more arithmetic logic units (ALUs); be a multi-core processor; or include one or more processors 652. Although this disclosure describes and illustrates a particular processor, this disclosure contemplates any suitable processor.

In particular embodiments, memory 654 includes main memory for storing instructions for processor 652 to execute, or data that can be manipulated by processor 652. As an example and not by way of limitation, computer system 650 may load instructions from storage 656 or another source (such as, for example, another computer system 650) to memory 654. Processor 652 may then load the instructions from memory 654 to an internal register or internal cache. During or after execution of the instructions, processor 652 may write one or more results (which may be intermediate or final results) to the internal register or internal cache. Processor 652 may then write one or more of those results to memory 654. One or more memory buses (which may each include an address bus and a data bus) may couple processor 652 to memory 654. Bus 662 may include one or more memory buses, as described below. One or more memory management units (MMUs) reside between processor 652 and memory 654 and facilitate accesses to memory 654 requested by processor 652. Memory 654 includes random access memory (RAM).

As an example and not by way of limitation, storage 656 may include a Hard Disk Drive (HDD), a floppy disk drive, flash memory, an optical disc, a magneto-optical disc, magnetic tape, or a Universal Serial Bus (USB) drive or a combination of two or more of these. Storage 656 may include removable or non-removable (or fixed) media, where appropriate. In particular embodiments, storage 656 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these.

In particular embodiments, I/O interface 658 includes hardware, software, or both providing one or more interfaces for communication between computer system 650 and one or more I/O devices. One or more of these I/O devices may enable communication between a person and computer system 650. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these.

Communication interface 660 includes hardware, software, or both providing one or more interfaces for communication between computer system 650 and one or more other computer systems 650 on one or more networks. As an example and not by way of limitation, communication interface 660 may include a network interface controller (NIC) or network adapter for communicating with an Ethernet or other wire-based network or a wireless NIC (WNIC) or wireless adapter for communicating with a wireless network, such as a WI-FI network. As an example, computer system 650 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these.

In particular embodiments, bus 662 includes hardware, software, or both coupling components of computer system 650 to each other. As an example and not by way of limitation, bus 662 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 662 may include one or more buses 662, where appropriate. Although this disclosure describes and illustrates a particular bus, this disclosure contemplates any suitable bus or interconnect.

Herein, reference to a computer-readable storage medium encompasses one or more non-transitory, tangible computer-readable storage media possessing structure that may store a computer program or data. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a Secure Digital card, a Secure Digital drive, or another suitable computer-readable storage medium or a combination of two or more of these, where appropriate. Herein, reference to a computer-readable storage medium excludes any medium that is not eligible for patent protection under 35 U.S.C. §101.

One or more embodiments can also be fabricated as computer readable code on a non-transitory computer readable medium. Herein, reference to software may encompass one or more applications, bytecode, one or more computer programs, one or more executables, one or more instructions, logic, machine code, one or more scripts, or source code, and vice versa, where appropriate.

The present disclosure encompasses all changes, substitutions, variations, alterations, and modifications to the example embodiments herein that a person having ordinary skill in the art would comprehend.

What is claimed is:

1. A method comprising:
    sending an interface to a client computer for a betting game to be played by a player;
    starting an online game that is displayed in the interface for the betting game;
    detecting a bet placed in the betting game;
    determining an outcome of the bet in the betting game;
    advancing an avatar along a path of the online game, wherein an amount of advancement of the avatar is based on the outcome of the bet;
    invoking an API of a social network to identify friends of the player in the social network;
    detecting when friends of the player are in a section of the path visible to the player in the game; and
    displaying in the interface the friends of the player that are in the section of the path, wherein operations of the method are executed by a processor.

2. The method as recited in claim 1, wherein advancing the avatar further includes:
    placing a first currency on the path, wherein the first currency is unusable for betting on the betting game; and
    collecting the first currency on the path as the avatar advances along the path.

3. The method as recited in claim 2, further including:
    awarding first currency when the outcome is a loss of the bet.

4. The method as recited in claim 2, further including:
    awarding a first amount of first currency when the outcomes is a loss of the bet; and
    awarding a second amount of first currency when outcome is a win of the bet.

5. The method as recited in claim 1, wherein the path includes milestones, wherein the method further includes:
    providing a game reward each time the avatar reaches a milestone while advancing along the path.

6. The method as recited in claim 1, wherein determining an outcome of the bet further includes:
    evaluating game mechanics rules; and
    determining the outcome based on the game mechanics rules.

7. The method as recited in claim 6, wherein the game mechanics rules include one or more of a probability of winning for each possible win in the game, a big win threshold value for determining when a big win occurs, or sharing amounts when sharing big wins with other players.

8. The method as recited in claim 1, further including:
    presenting in the interface one or more choices for characters to be used as the avatar;
    receiving a selection for one of the characters; and
    using the selected character as the avatar in the game.

9. The method as recited in claim 8, further including:
    defining parts for building a first character; and
    making the first character available for selection as the avatar after a player has collected the parts.

10. The method as recited in claim 1, wherein operations of the method are performed by a computer program when executed by one or more processors, the computer program being embedded in a non-transitory computer-readable storage medium.

11. A server for executing a game, the server comprising:
    a processor; and
    a non-transitory memory in communication with the processor, the processor being operable to:
        send an interface to a client computer for a betting game to be played by a player;
        start an online game that is displayed simultaneously with the interface for the betting game;
        determine an outcome of the bet in the betting game;
        advance an avatar along a path of the online game, wherein an amount of advancement of the avatar is based on the outcome of the bet;
        invoke an API of a social network to identify friends of the player in the social network;
        detect when friends of the player are in a section of the path visible to the player in the game; and
        display in the interface avatars of the friends of the player that are in the section of the path.

12. The server of claim 11, wherein the non-transitory memory further includes program instructions for a social manager that manages social relationships of players in the game.

13. The server of claim 11, wherein the advance of the avatar includes:
placing a first currency on the path, wherein the first currency is unusable for betting on the betting game; and
collecting the first currency on the path as the avatar advances along the path.

14. The server of claim 13, wherein the advance of the avatar further includes:
awarding first currency when the outcomes is a loss of the bet.

15. A non-transitory computer-readable storage medium storing a computer program, the computer-readable storage medium comprising:
program instructions for sending an interface to a client computer for a betting game to be played by a player;
program instructions for starting an online game that is displayed simultaneously with the interface for the betting game;
program instructions for detecting a bet placed in the betting game;
program instructions for determining an outcome of the bet in the betting game;
program instructions for advancing an avatar along a path of the online game, wherein an amount of advancement of the avatar is based on the outcome of the bet;
program instructions for invoking an API of a social network to identify friends of the player in the social network;
program instructions for detecting when friends of the player are in a section of the path visible to the player in the game; and
program instructions for displaying in the interface a profile picture of the friends of the player that are in the section of the path.

16. The storage medium as recited in claim 15, further including:
program instructions for enabling an user to collect parts, wherein a new avatar is added to a plurality of avatars when a player collects all parts required to build the new avatar.

17. The storage medium as recited in claim 16, further including:
program instructions for enabling the user to collect the parts by buying the parts.

18. The storage medium as recited in claim 16, further including:
program instructions for enabling the user to collect the parts by completing game tasks.

19. The storage medium as recited in claim 15, wherein each avatar from a plurality of avatars have unique game characteristics, the game characteristics including one or more of speed, strength, fighting ability, or collection ability.

* * * * *